US008391422B2

(12) United States Patent
Nomura et al.

(10) Patent No.: US 8,391,422 B2
(45) Date of Patent: Mar. 5, 2013

(54) TIME INFORMATION RECEIVER, RADIO WAVE TIMEPIECE AND STORAGE MEDIUM HAVING PROGRAM STORED THEREIN

(75) Inventors: Keiichi Nomura, Uenohara (JP); Hideo Abe, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 194 days.

(21) Appl. No.: 12/652,192

(22) Filed: Jan. 5, 2010

(65) Prior Publication Data

US 2010/0177854 A1 Jul. 15, 2010

(30) Foreign Application Priority Data

Jan. 9, 2009 (JP) ................................ 2009-003421

(51) Int. Cl.
*H04L 27/08* (2006.01)

(52) U.S. Cl. ....................................................... 375/340

(58) Field of Classification Search .................. 375/130, 375/340, 343, 357, 141, 142; 455/418, 423, 455/550.1, 411, 412.1, 566; 343/728, 788
See application file for complete search history.

(56) References Cited

U.S. PATENT DOCUMENTS

| | | | | |
|---|---|---|---|---|
| 5,724,383 | A * | 3/1998 | Gold et al. | 375/141 |
| 5,790,591 | A * | 8/1998 | Gold et al. | 375/142 |
| 6,192,007 | B1 * | 2/2001 | Aoshima | 368/10 |
| 6,381,251 | B1 * | 4/2002 | Sano et al. | 370/480 |
| 6,771,990 | B1 * | 8/2004 | Nilsson | 455/566 |
| 6,778,819 | B2 * | 8/2004 | Sumino | 455/412.1 |
| 6,999,787 | B2 * | 2/2006 | Zschintzsch | 455/550.1 |
| 7,171,161 | B2 * | 1/2007 | Miller | 455/67.11 |
| 7,539,085 | B2 * | 5/2009 | Pikula et al. | 368/10 |
| 7,555,029 | B2 * | 6/2009 | Kondo | 375/130 |
| 2006/0078038 | A1 * | 4/2006 | McCorkle | 375/130 |
| 2007/0152900 | A1 | 7/2007 | Takada | |
| 2009/0168937 | A1 * | 7/2009 | Lee et al. | 375/357 |

FOREIGN PATENT DOCUMENTS

| | | | |
|---|---|---|---|
| JP | 2003-121571 | A | 4/2003 |
| JP | 2006-153626 | A | 6/2006 |
| JP | 2007-147328 | A | 6/2007 |
| WO | WO 2005/006213 | A1 | 7/2005 |
| WO | WO 2005/062137 | A1 | 7/2005 |

OTHER PUBLICATIONS

Japanese Office Action dated Jan. 4, 2011, issued in counterpart Japanese Patent Application No. 2009-003421, and English translation of the Japanese Office Action.

* cited by examiner

*Primary Examiner* — Daniel Washburn
*Assistant Examiner* — Fitwi Hailegiorgis
(74) *Attorney, Agent, or Firm* — Holtz, Holtz, Goodman & Chick, PC

(57) ABSTRACT

A time information receiver including a reception unit for receiving and demodulating a standard radio wave containing a time code in which data pulses are arranged at a predetermined period; an analyzer for analyzing the time code from a demodulated signal obtained by demodulating the standard radio wave; a time-shift adder for executing an addition processing of adding a pulse waveform of the demodulated signal and a pulse waveform of a signal obtained by shifting the demodulated signal by a predetermined time; and a judger for judging a code type of the time code contained in the received standard radio wave on the basis of a addition result of the time-shift adder.

9 Claims, 12 Drawing Sheets

TIME INFORMATION RECEIVER, RADIO WAVE TIMEPIECE AND STORAGE MEDIUM HAVING PROGRAM STORED THEREIN

CROSS-REFERENCE TO RELATED APPLICATIONS

This application is based on and claims the benefit of priority from the prior Japanese Patent Application No. 2009-003421 filed on Jan. 9, 2009 including specification, claims, drawings and summary, the entire contents of which are incorporated herein by reference.

BACKGROUND OF THE INVENTION

1. Field of the Invention

The present invention relates a time information receiver for receiving a standard radio wave and analyzing a time code from the received standard radio wave, a radio wave timepiece for correcting the time on the basis of the time code, and a storage medium in which a program for enabling analysis of a time code from a demodulated signal of the standard radio wave.

2. Description of Related Art

There has been known a radio wave timepiece for receiving a standard radio wave containing a time code and correcting the time on the basis of the received standard radio wave. Furthermore, there is also known a multiband-compliant radio wave timepiece that can receive a plurality of types of standard radio waves transmitted from various places in the world.

The multiband-compliant radio wave timepieces are classified into a manual switching type timepiece in which a reception style of receiving a standard radio wave from any transmission station is manually switched and an automatic switching type timepiece in which the reception style is automatically switched.

According to the manual switching type timepiece, a user is required to manually change the setting of the reception style when the user moves to each place in the world. This changing operation is not frequently executed, so that the user is liable to forget how to change the setting of the reception style and thus this type timepiece is cumbersome to users.

On the other hand, according to the automatic switching type timepiece, identification of a transmission station is not performed; however, reception of the standard radio wave is repeated while the reception style is switched one by one until the reception of the standard radio wave succeeds. Accordingly, this type timepiece must execute needless reception processing, so that the reception time increases and current consumption also increases.

SUMMARY OF THE INVENTION

According to an aspect of the present invention, there is provided a time information receiver comprising: a reception unit for receiving and demodulating a standard radio wave containing a time code in which data pulses are arranged at a predetermined period; an analyzer for analyzing the time code from a demodulated signal obtained by demodulating the standard radio wave; a time-shift adder for executing an addition processing of adding a pulse waveform of the demodulated signal and a pulse waveform of a signal obtained by shifting the demodulated signal by a predetermined time; and a judger for judging a code type of the time code contained in the received standard radio wave on the basis of a addition result of the time-shift adder.

DESCRIPTION OF THE PREFERRED EMBODIMENT

A preferred embodiment according to the present invention will be described hereunder with reference to the accompanying drawings.

Figure 1:
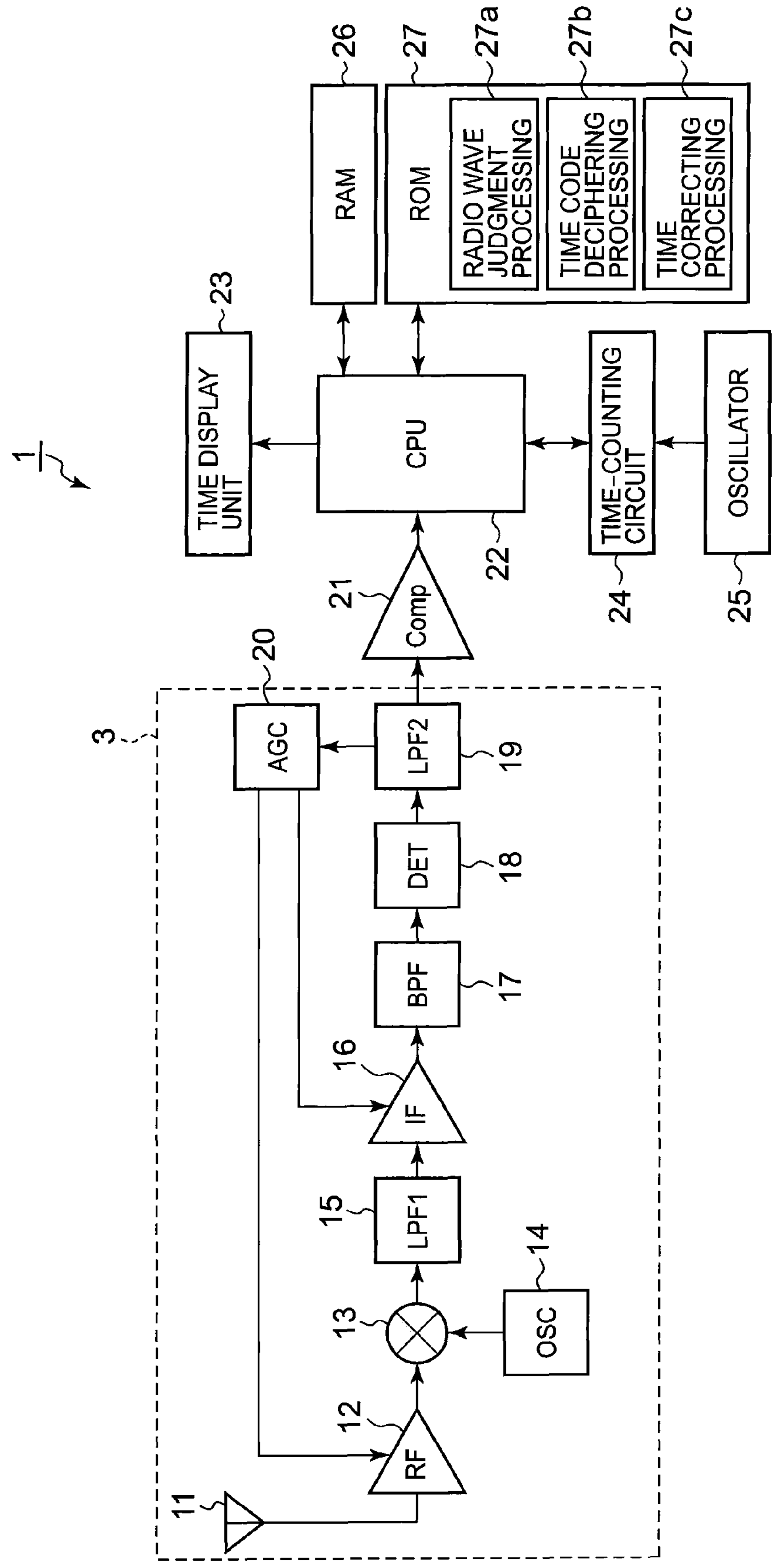
FIG. 1 is a block diagram showing the overall construction of a radio wave timepiece according to an embodiment of the present invention.

FIG. 1 is a block diagram showing the overall construction of a radio wave timepiece according to an embodiment of the present invention.

The radio wave timepiece 1 of this embodiment is a timepiece module that can receive a plurality of types of standard radio waves transmitted from a plurality of transmission stations in the world to correct the time.

This radio wave timepiece 1 comprises an radio wave receiver (reception unit) 3 for receiving a standard radio wave and demodulating it into a time code signal, a comparator 21 for detecting whether the time code signal demodulated by the receiver 3 is high level or low level, CPU (Central Processing Unit) 22 inputting the time code signal to correct the time and performing the overall control of the timepiece function, a time display unit (display unit) 23 for displaying the time by rotating hands or by digital display, a time counting circuit (time counter) 24 for counting the time, an oscillator 25 for supplying a signal having a fixed frequency to the time counting circuit 24, RAM (Random Access Memory) 26 for supplying a working memory space to CPU 22, ROM (Read Only Memory) 27 as a storage medium for storing control data and control programs, etc.

The radio wave receiver 3 comprises an antenna 11 for receiving a standard radio wave, an RF amplifier 12 for amplifying a reception signal, a mixer 13 for converting the reception signal to an intermediate frequency signal, a local oscillator 14 for supplying the mixer 13 with a predetermined frequency signal, a first low pass filter 15 for removing noise, an IF amplifier 16 for amplifying the intermediate frequency signal, a band pass filter 17 for extracting the intermediate frequency signal, a detector 18 for demodulating the intermediate frequency signal into a time code signal, a second low pass filter 19 for removing noise, an AGC (Automatic Gain control) circuit 20 for generating an AGC signal to make the average signal level of the demodulated time code signal (demodulated signal) constant and adjusting the gains of the RF amplifier 12 and the IF amplifier 16, etc.

In this embodiment, a time information receiver is constructed by the radio wave receiver 3, the comparator 21, CPU 22, ROM 27 and RAM 26. Furthermore, an analyzer, a decipherer, a time correction section, and a computer executing a program are constructed by CPU 22.

The comparator 21 compares the signal level of the time code signal with a predetermined threshold value and outputting a high-level signal or low-level signal representing the comparison result to CPU 22. The comparison threshold value of the comparator 21 is set to the intermediate signal level between the high level and the low level of the time code signal sent from the radio wave receiver 3. Alternatively, two threshold values which are a little nearer to the high level and the low level respectively may be set so that hysteresis is applied by these two threshold values to compare the signal level of the time code signal.

The antenna 11 can switch the synchronization frequency in conformity with the frequencies of standard radio waves transmitted from various places in the world, such as 40 KHz, 60 kHz, 75 kHz, etc. The local oscillator 14 can switch the frequency of the oscillation signal to be supplied to the mixer in conformity with the reception frequency. The synchronization frequency of the antenna 11 and the frequency of the oscillation signal of the local oscillator 14 are switched on the basis of a channel switching signal (not shown) from CPU 22.

In ROM 27 there are stored not only a processing program of a time counting function for displaying the present time by renewing the time display unit 23 according to the time count data of the time counting circuit 24, but also an radio wave judgment processing program 27*a* for judging the code type of the received time code, a time code deciphering program 27*b* for deciphering the time code according to the format of the judged code type to determine time information, a time correcting program 27*c* for correcting the time count data of the time counting circuit 24 on the basis of the determined time information, etc.

These processing programs are stored in ROM 27, and additionally they may be stored in a portable storage medium such as an optical disc, a non-volatile memory such as a flash memory or the like which is readable by a general-purpose computer, and down-loaded from the general-purpose computer into a memory of the radio wave timepiece 1. Furthermore, such a style that these programs are downloaded into the memory of the radio wave timepiece 1 through a communication line or a computer by using a carrier wave as a medium may be adopted.

CPU 22 executes the processing program of the time counting function at all times; however, it executes the above processing programs 27*a* to 27*c* when a predetermined condition is satisfied, for example, when a predetermined time arrives or when there is an operation input from a user. The time code deciphering processing and the time correcting processing are well-known techniques, and thus the detailed description thereof is omitted.

Next, the 60 kHz standard radio wave judgment processing executed at the last half portion of the above radio wave judgment processing program 27*a* will be described in detail. At the former stage of the 60 kHz standard radio wave judgment processing, CPU 22 switches the reception channel to identify the frequency band of an arriving radio wave firstly. When CPU 22 identifies that the standard radio wave of 60 kHz arrives, it executes the 60 kHz standard radio wave judgment processing.

Figure 2:
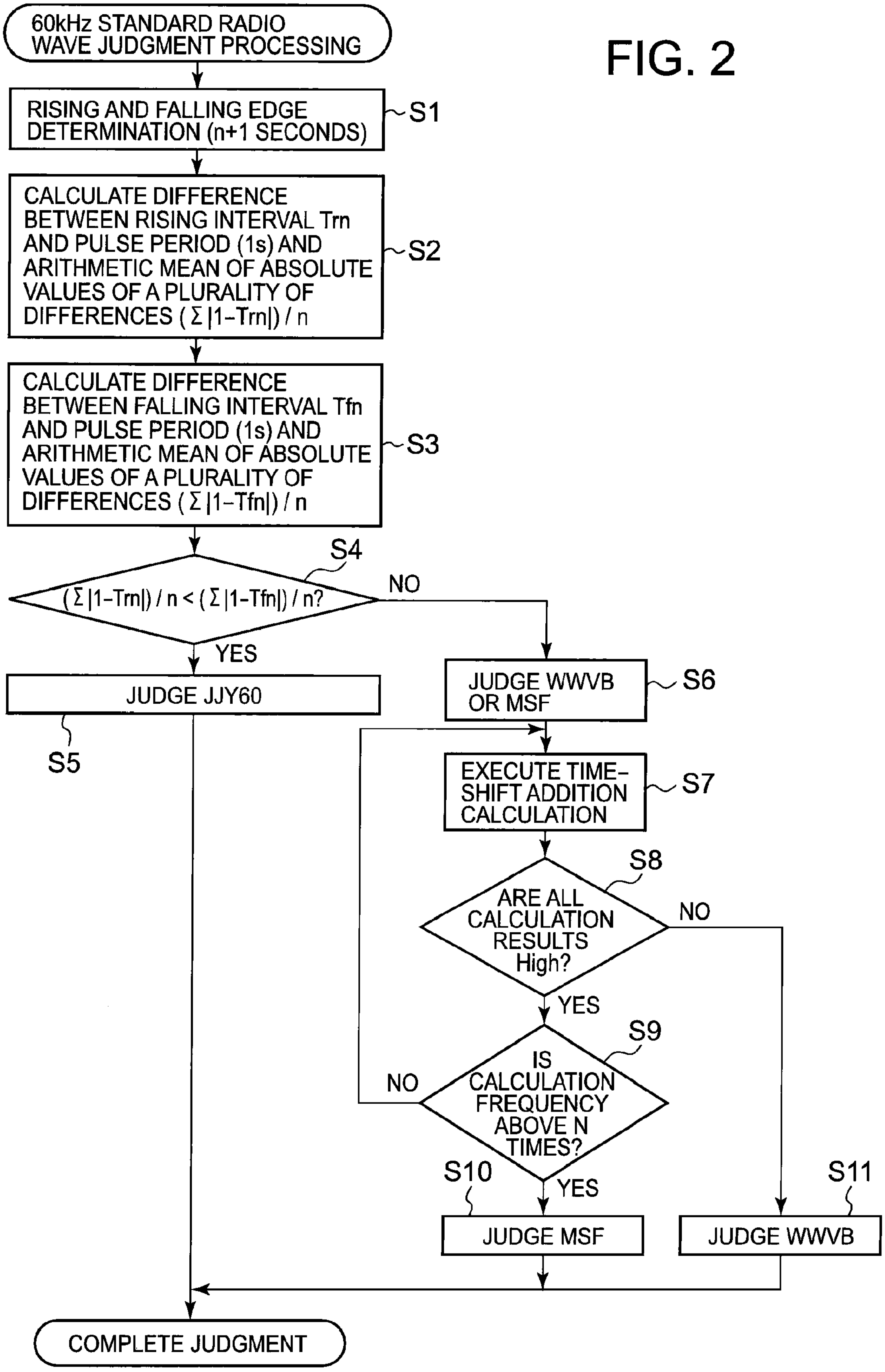
FIG. 2 is a flowchart showing the procedure of radio wave judgment processing executed by CPU.

FIG. 2 is a flowchart showing the 60 kHz standard radio wave judgment processing executed by CPU 22.

The 60 kHz standard radio wave judgment processing judges which one of the standard radio wave “JJY60” of the Fukuoka station in Japan, the standard radio wave “WWVB” of the USA station and the standard radio wave “MSF” of the UK station the standard radio wave transmitted at 60 kHz corresponds to.

When the 60 kHz standard radio wave judgment processing is started, CPU 22 firstly executes edge determination of rising and falling edges of a time code signal during the period of (n+1) seconds while taking the output of the comparator 21 for this period in step S1 (determining section). With respect to the period for which the edge determination is executed, if it is excessively short, the judgment precision of the time code is lowered. On the other hand, if it is excessively long, the time required for the judgment processing and current consumption increases. In consideration of both the problems, the edge determination period is set in the range from 9 seconds to 20 seconds, more preferably in the range from 10 seconds to 15 seconds. In this embodiment, the edge determination period is set to 11 seconds (n=10).

When the edge determination is completed, in subsequent steps S2 to S6, CPU 22 executes the first radio wave judgment processing: the processing of judging which one of “JJY60”, “WWVB” and “MSF” the time code signal demodulated corresponds to. That is, in steps S2, S3, predetermined calculation is executed from a plurality of rising edges and a plurality of falling edges of the time code signal determined in step S1. Subsequently, these calculation values are compared with each other in step S4. On the basis of this comparison result, it is determined that the demodulated time code signal corresponds to “JJY60” (step S5) or “WWVB” or “MSF” (step S6).

Next, the first radio wave judgment processing of these steps (S2 to S6) will be described in detail.

[First Radio Wave Judgment Processing]

Figure 3:
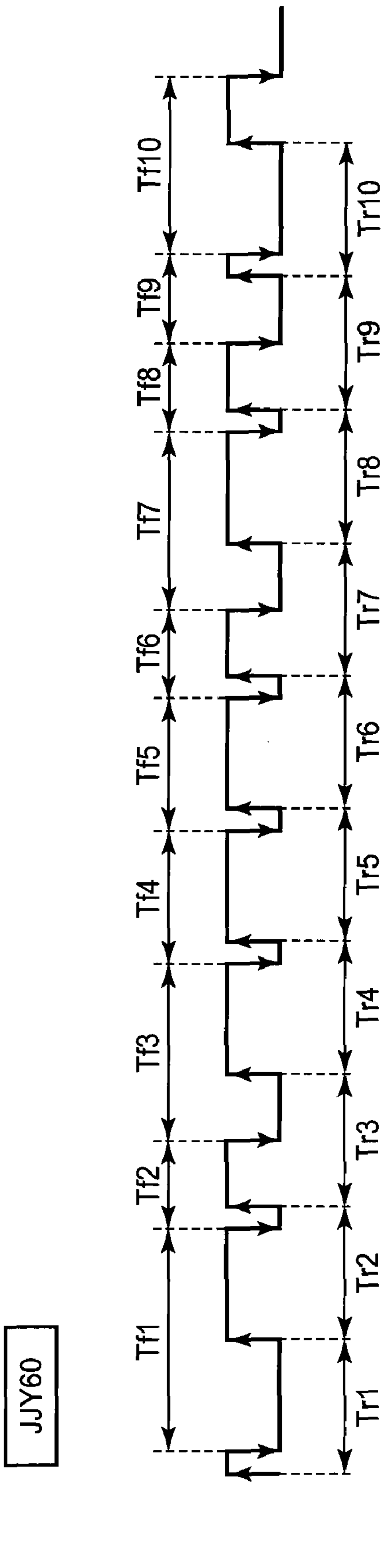
FIG. 3 is a diagram showing an example of the time interval of rising edges and the time interval of falling edges with respect to a time code of a standard radio wave "JJY60" of the Fukuoka station in Japan.
Figure 4:
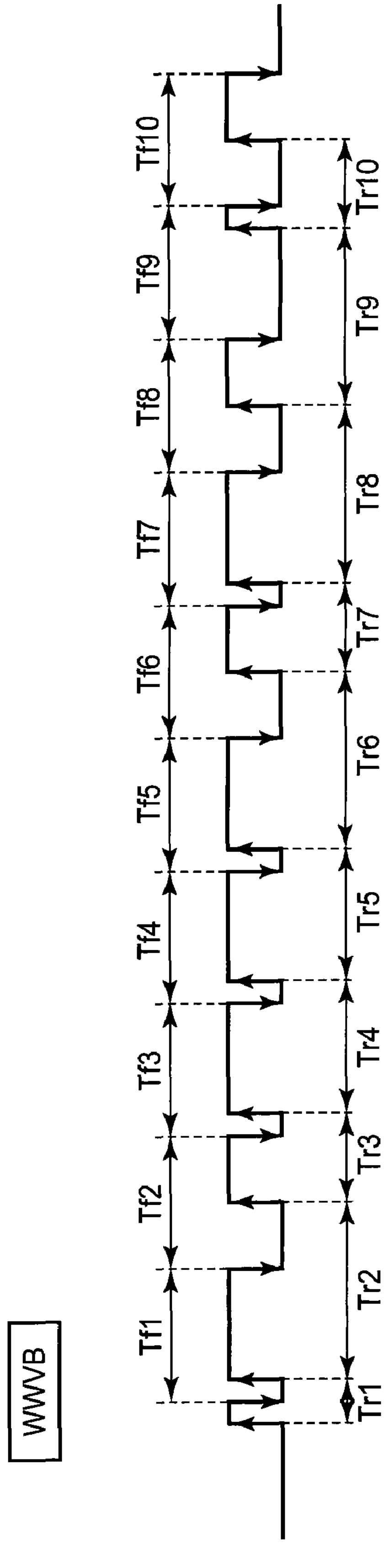
FIG. 4 is a diagram showing an example of the time interval of rising edges and the time interval of falling edges with respect to a time code of a standard radio wave "WWVB" in the USA.
Figure 9A:
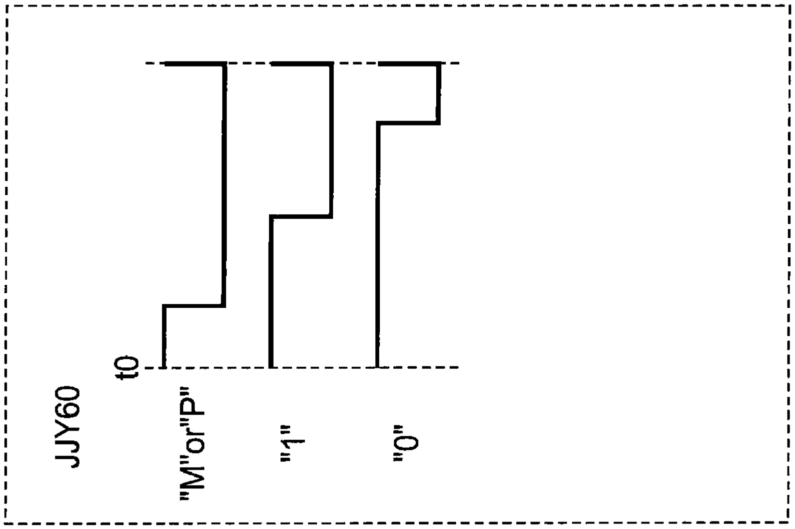
FIGS. 9A to 9C are diagrams showing the waveforms of respective data pulses of three code types of the time code as judgment targets, wherein FIG. 9A show the waveforms of respective data pulses of the time code contained in the standard radio wave "JJY60" of the Fukuoka Station in Japan, FIG. 9B show the waveforms of respective data pulses of the time code contained in the standard radio wave "WWVB" in the USA, and FIG. 9C show the waveforms of respective data pulses of the time code contained in the standard radio wave "MSF" in the UK.
Figure 9B:
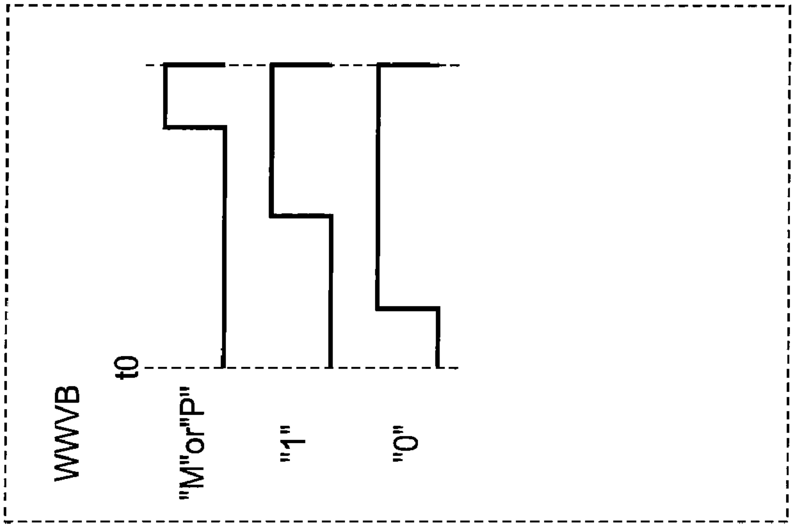
Figure 9C:
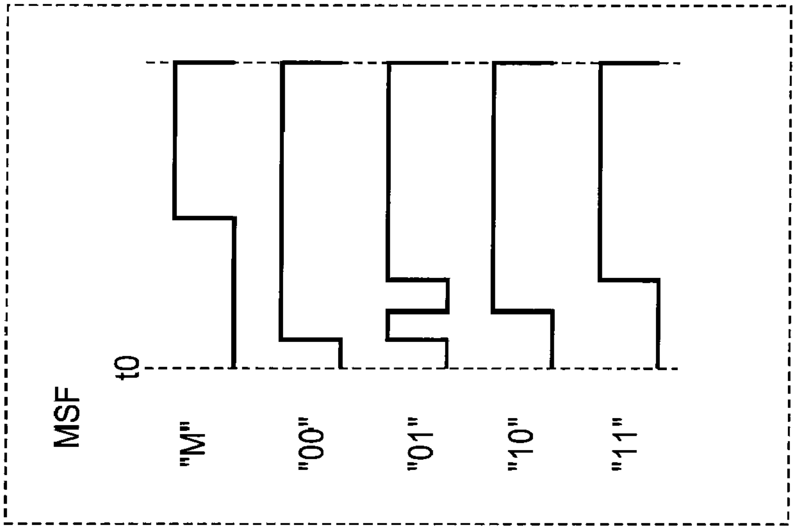

FIG. 3 is a diagram showing the time interval of rising edges and the interval of the falling edges in the time code of the standard radio wave “JJY60”, and FIG. 4 is a diagram showing the time interval of the rising edges and the time interval of the falling edges in the time code of the standard radio wave “WWVB”. FIGS. 9A to 9C are diagrams showing respective data pulse waveforms constituting the three types of standard radio waves of “JJY60” (FIG. 9A), “WWVB” (FIG. 9B) and “MSF” (FIG. 9C).

As shown in FIG. 9A, the data pulse of the standard radio wave “JJY60” has a rising edge thereof at a start point t0 of one second, and three kinds of data (marker “M”, position marker “P”, data value “1”, “2”) are represented by the pulse width. On the other hand, as shown in FIGS. 9B and 9C, the data pulse of the standard radio wave “WWVB”, “MSF” has a falling edge thereof at a start point t0 of one second, and three kinds or five kinds of data (marker “M”, “P”, data value "1", "0", "00", "01", "10", "11") are represented by the pulse width or the pulse waveform. Sixty data pulses describe above are arranged at a period of one second, whereby the time code comprising one set of data pulses is constructed.

In the first radio wave judgment processing, the rising edges of the data pulses of the time code of "JJY60" are adjusted at the start points t0 of every seconds respectively as shown in FIG. 9A, and the falling edges of the data pulses of the time codes of "WWVB" and "MSF" are adjusted at the start points t0 of every seconds respectively as shown in FIGS. 9B and 9C. The code types of these time codes are judged by utilizing the above fact.

When the processing is shifted to the first radio wave judgment processing, in step S2 of FIG. 2, CPU 22 first sets a plurality of pairs of the rising edges so as the one pair consists of two adjacent rising edges out of the plurality of rising edges determined in step S1, determines respective time intervals Tr1 to Trn of these pairs (see FIGS. 3 and 4) and calculates the difference between each of the time intervals Tr1 to Trn and the pulse period "1s". In addition, CPU 22 calculates the arithmetic mean of the absolute values of the respective differences as a rising dispersion amount representing the dispersion degree of the plurality of differences according to the following expression (1). In this embodiment, the rising dispersion amount is calculated from the ten edge intervals Tr1 to Tr10.

$$\left(\sum_{n=1}^{10} |1 - Trn|\right) \Big/ 10 \tag{1}$$

Subsequently, in step S3 of FIG. 2, CPU 22 sets a plurality of pairs of the falling edges so as the one pair consists of two adjacent falling edges out of the plurality of falling edges determined in step S1, determines respective time intervals Tf1 to Tfn of these pairs (see FIGS. 3 and 4) and calculates the difference between each of the time intervals Tf1 to Tfn and the pulse period "1s". In addition, CPU 22 calculates the arithmetic mean of the absolute values of the respective differences as a falling dispersion amount representing the dispersion degree of the plurality of differences according to the following expression (2). In this embodiment, the falling dispersion amount is calculated from the ten edge intervals Tf1 to Tf10.

$$\left(\sum_{n=1}^{10} |1 - Tfn|\right) \Big/ 10 \tag{2}$$

Here, if the received standard radio wave is "JJY60", as shown in FIG. 3, the rising edges are adjusted at a one-second period in the waveform of an ideal time code signal, and thus the rising dispersion amount of the expression (1) is equal to "0". On the other hand, the falling edges are dispersed with respect to the one-second period, and thus the falling dispersion amount of the expression (2) is more than zero, for example, "0.27". In the time code of "JJY60", even when the same data value (for example, "0") is sequentially disposed, a position marker pulse having a different pulse width is disposed once during 10 seconds, and dispersion necessarily occurs in the ten edge intervals Tf1 to Tf10.

If the received standard radio wave is "WWVB", as shown in FIG. 4, falling edges are adjusted at one-second period in the waveform of an ideal time code signal, and the falling dispersion amount of the expression (2) is equal to "0". On the other hand, rising edges are dispersed with respect to the one-second period, and thus the rising dispersion amount of the expression (1) is more than zero, for example, "0.27". In the time code of "WWVB", even when the same data value (for example, "0") is sequentially disposed, a position marker pulse having a different pulse width is disposed once during ten seconds, and thus dispersion necessarily occurs in ten edge intervals Tr1 to Tr10.

If the received standard radio wave is "MSF", the same phenomenon as "WWVB" basically occurs in this case. However, the data pulses of "MSF" contain a data pulse having a rising edge and a falling edge at some midpoint of one data pulse as in the case of the data pulse of "01" of FIG. 9C. Therefore, when this data pulse is received, the falling dispersion amount is more than zero. However, when this data pulse is received, the same value is added to the rising dispersion amount due to the rising edge at some midpoint of the data pulse concerned. Accordingly, when the falling dispersion amount and the rising dispersion amount are compared with each other, the effects of the edges at some midpoint are substantially offset with each other.

In the edge determination processing of the step S3, when a high-level pulse having a short pulse width of about 0.1 second is contained in the output of the comparator 21, this high-level pulse is regarded as a noise and the start edge and the end edge of this pulse may be neglected, whereby the effects of the rising and falling edges at some midpoints of the data pulse of the data value "01" contained in the time code of "MSF" can be excluded.

When the rising dispersion amount and the falling dispersion amount are calculated as described above, CPU 22 subsequently compares the rising dispersion amount with the falling dispersion amount as shown in the following expression (3) in step S4 of FIG. 2.

$$\left(\sum_{n=1}^{10} |1 - Trn|\right) \Big/ 10 < \left(\sum_{n=1}^{10} |1 - Tfn|\right) \Big/ 10 \tag{3}$$

As described above, with respect to the rising dispersion amount and the falling dispersion amount, the latter is larger than the former in the time code of "JJY60", and thus the comparison result of the step S4 is "YES". On the other hand, in the case of the time code of "MSF" or "WWVB", the former is larger, and thus the comparison result of the step S4 is "NO".

When interference of noise increases or the signal wave is deteriorated due to reduction of the electric field intensity of the standard radio wave, fluctuation occurs in the determination timing of the rising edge or the falling edge of the data pulse. Therefore, even when one of the rising dispersion amount and the falling dispersion amount is equal to "0" in the case of a time code having an ideal waveform, the calculation value thereof in the actual time code is more than zero. However, the value of the other dispersion amount is almost larger than the calculation value in the case of the ideal waveform due to the fluctuation of the determination timing. Conversely, it is rare that the value of the dispersion amount is smaller than the calculation value in the case of the ideal waveform. Accordingly, the comparison result of the expression (3) is coincident with that in the case of the ideal waveform unless the signal wave is extremely deteriorated.

Accordingly, when the comparison result of the step S4 is "YES", CPU 22 judges that the time code is based on "JJY60"

(step S5). When the comparison result of the step S4 is "NO", CPU 22 judges that the time code is based on "WWVB" or "MSF" (step S6).

When the standard radio wave "JJY60" is identified in step S5, the 60 kHz standard radio wave judgment processing is finished without any further action. On the other hand, when the standard radio wave "WWBV" or "MSF" is identified in step S6, the code type of the time code has not yet uniquely determined. Therefore, the second radio wave judgment processing of steps S7 to S11 is executed to judge whether the demodulated time code signal is based on "WWVB" or "MSF".

Next, the second radio wave judgment processing of the steps S7 to S11 will be described in detail.

[Second Radio Wave Judgment Processing]

Figure 5:
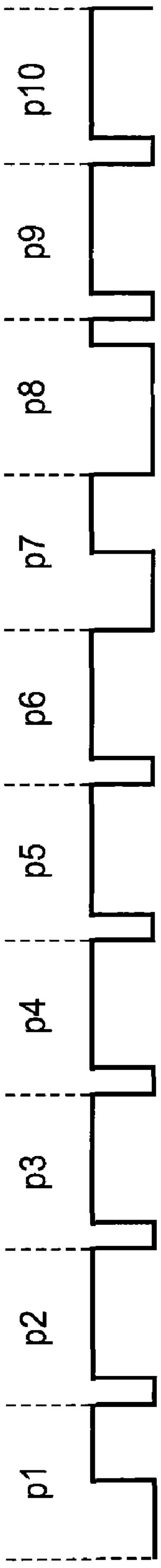
FIG. 5 is a data chart showing an example of a time code to be subjected to time-shift addition processing.

FIG. 5 is a data chart showing an example of a time code signal to be subjected to the time-shift addition processing, and FIGS. 6A to 6D are diagrams showing the content of the time-shift addition processing to the time code signal of FIG. 5.

In the second radio wave judgment processing, as shown in FIGS. 9B and 9C, the time code of "WWVB" contains a data pulse which is set to a low level subsequently to the time point of 500 ms, however, all the data pulses of the time code of "MSF" are set to high level subsequently to the time point of 500 ms. Each of the first type time code "MSF" and the second type time code "WWVB" is identified by utilizing the above difference.

When the processing shifts to the second radio wave judgment processing, in step S7 (time-shift adder), CPU 22 first executes the time-shift addition on each data pulse of the time code signal obtained by the edge determination in the step S1. The time-shift addition is defined as follows. One data pulse and a data pulse which is obtained by time-shifting the next data pulse by 500 ms (hereinafter referred to as "time-shifted data pulse") are subjected to logical addition over one second. For example, when the time code signal of FIG. 5 is obtained by the edge determination of the step S1, as shown in FIG. 6A, a first data pulse p1 and a time-shifted data pulse which is obtained by time-shifting a second data pulse p2 by 500 ms are subjected to logical addition from the start edge of the data pulse p1 for one second. As a result of the logical addition, the calculation result of a section in which at least one of the first data pulse and the time-shifted data pulse is set to high level becomes "high level" (logical value "1"), and the calculation result of a section in which both the first data pulse and the time-shifted data pulse are set to low level becomes "low level" (logical value "0").

When the calculation processing of the time-shift addition is executed once, it is determined in the next step S8 whether the calculation result indicates "high level" (logical value "1") in the overall section from the start edge to the end edge or not. When the calculation result indicates "high level" in the overall section as in the case of the calculation result of FIG. 6A, the processing shifts to step S9 to determine whether the calculation processing is executed at N times (for example, ten times) or more. When the number of times of the calculation processing has not yet reached N, the processing returns to the step S7 to execute the time-shift addition calculation on the next data pulse. On the other hand, when the calculation result indicates "low level" (logical value "0") in some section in the determination processing of the step S8, the processing shifts to the "NO" side.

Figure 6B:
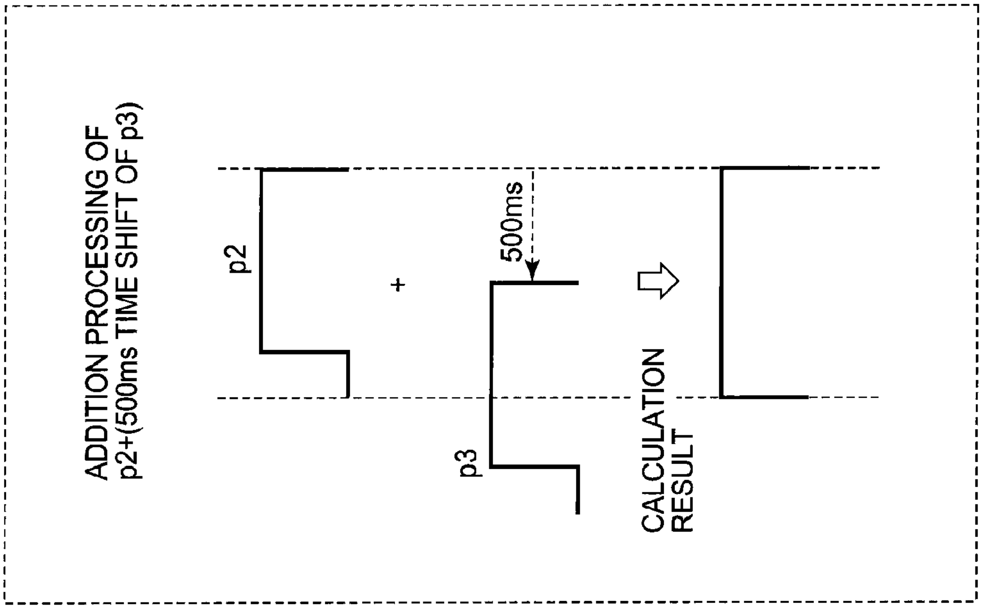
FIGS. 6A to 6D are diagrams showing the content of the time-shift addition processing on the time code of FIG. 5.
Figure 6A:
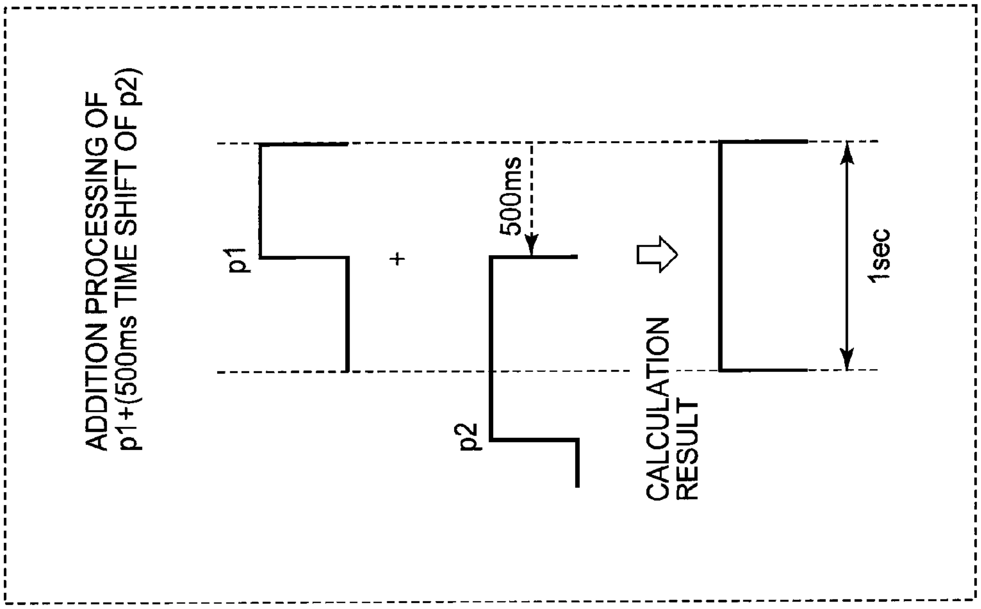

In the case of the time code signal of FIG. 5, the calculation result of the time-shift addition indicates "high level" in the overall section as shown in FIG. 6A, the processing returns to step S7 to execute the time-shift addition calculation on the next data pulse p2 (FIG. 6B). Furthermore, in the case of the time code signal of FIG. 5, the calculation result indicates "high level" in the overall section subsequently, and the time-shift addition processing is continued until the sixth data pulse p6 (FIG. 6C).

Figure 6D:
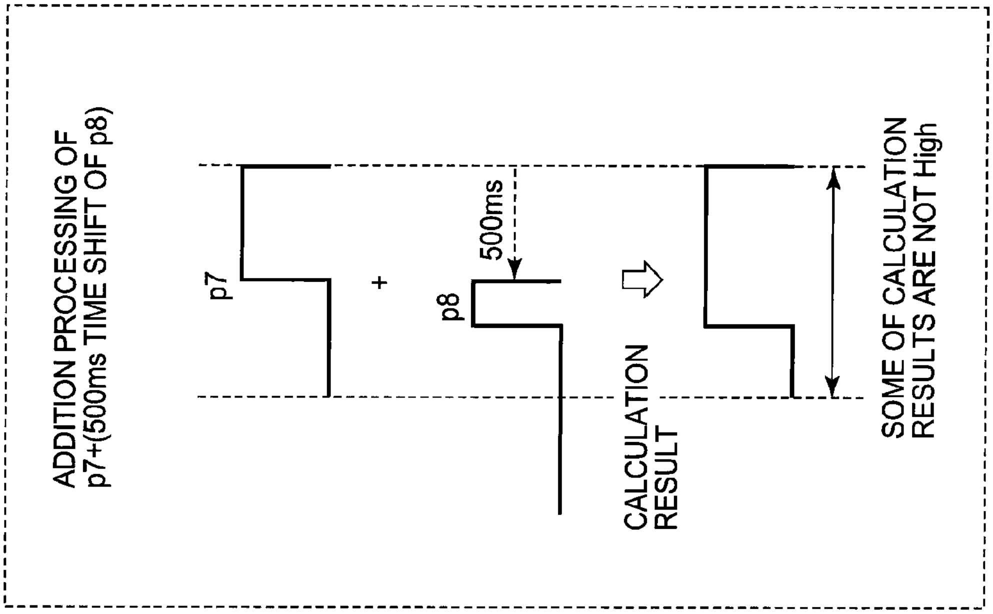
Figure 6C:
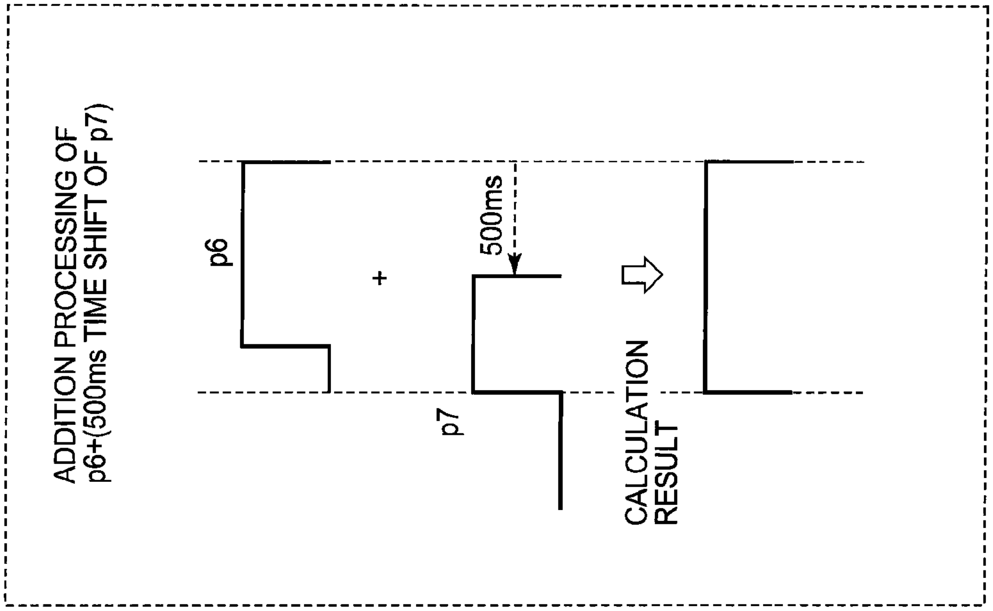
Figure 7A:
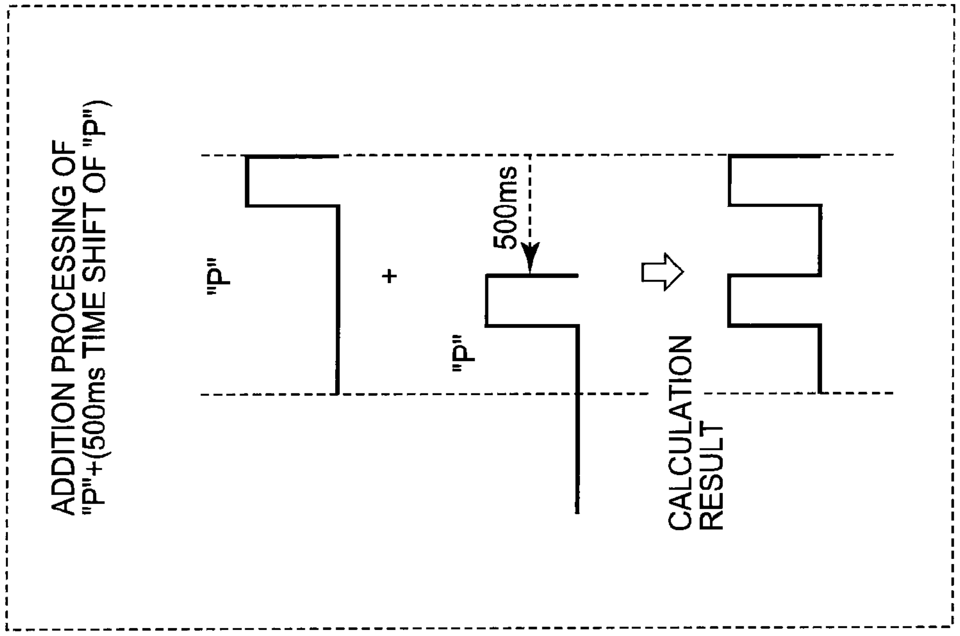
FIGS. 7A to 7D are diagrams showing an example of a combination in which a low level period appears in the result of the time-shift addition processing on the time code of the standard radio wave "WWVB" in the USA.
Figure 7B:
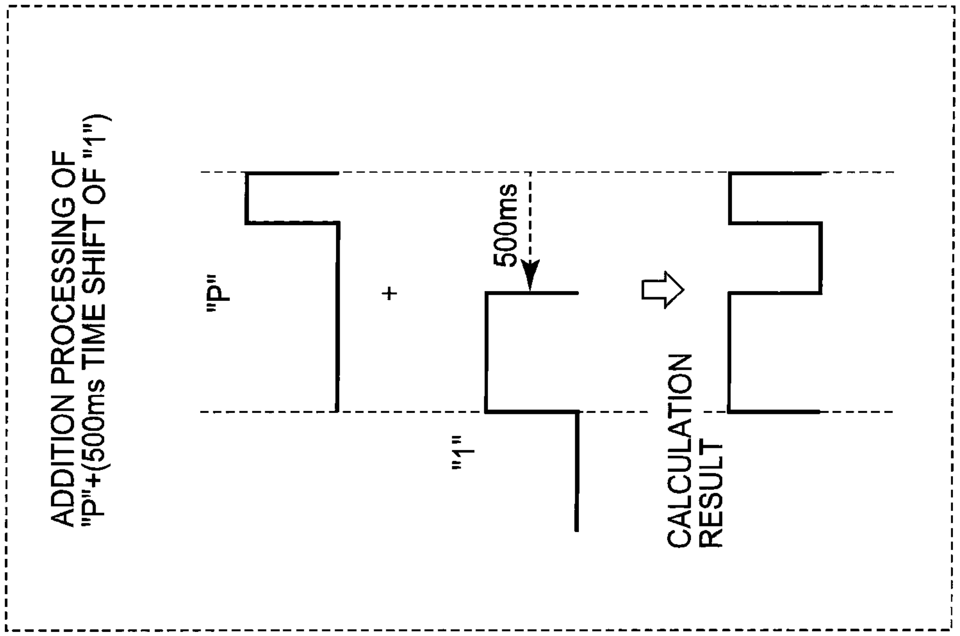
Figure 7D:
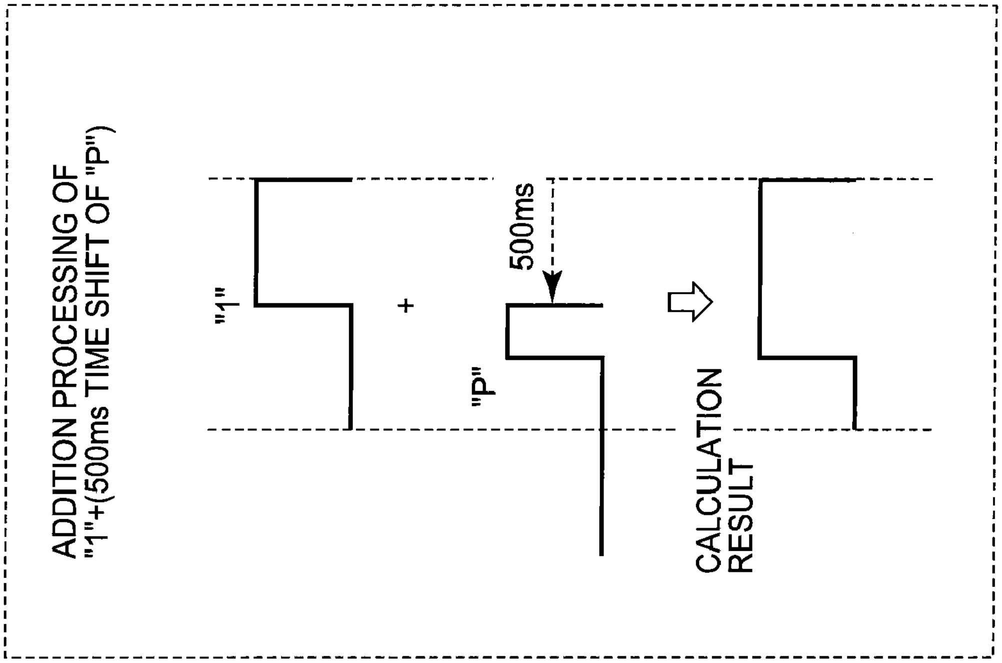
Figure 7C:
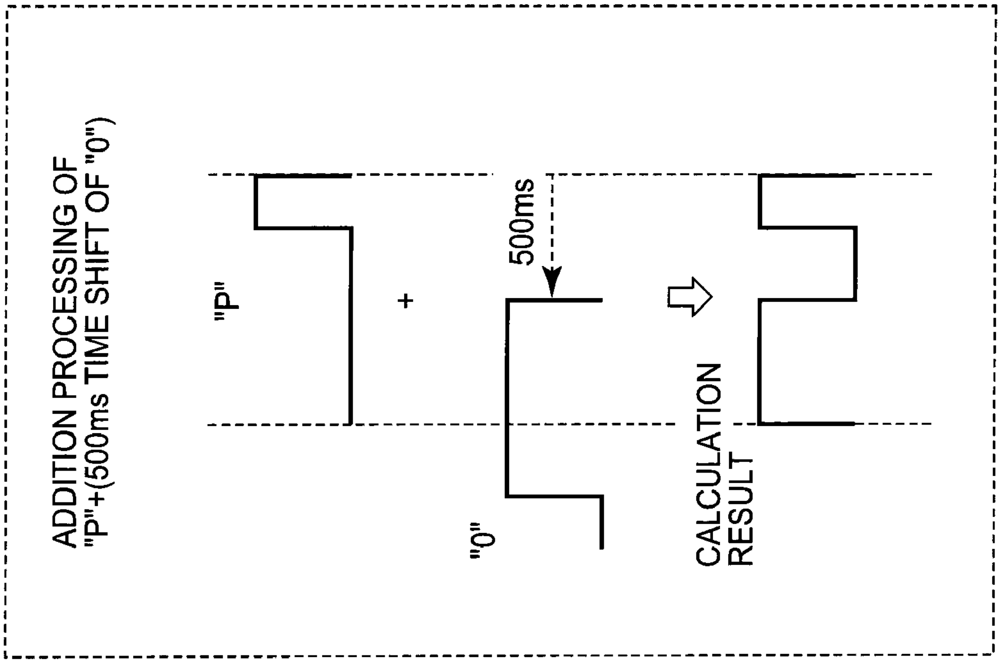
Figure 8A:
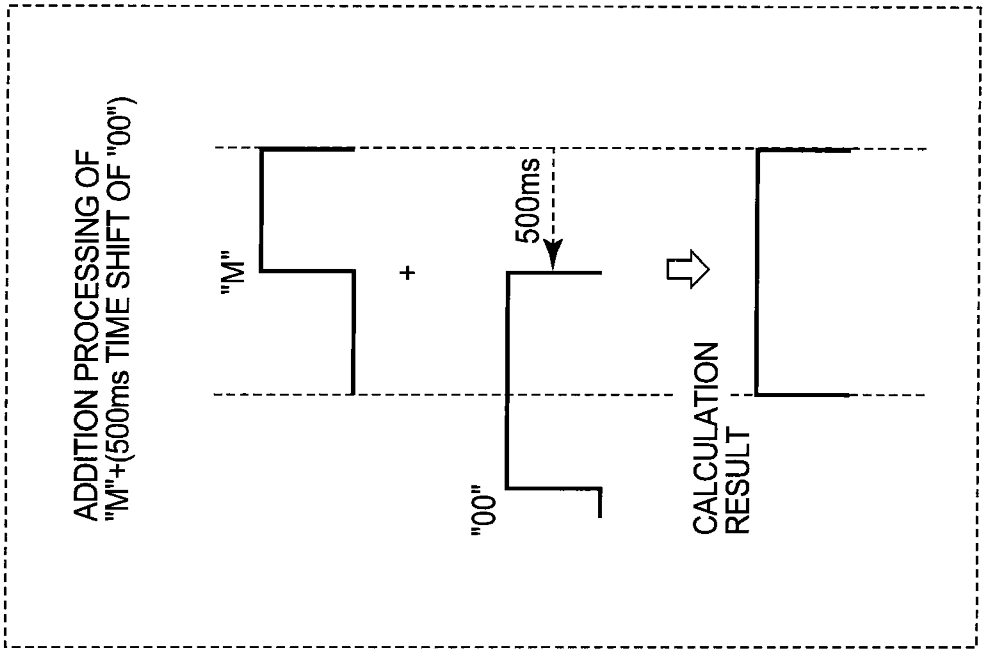
FIGS. 8A to 8D are diagrams showing an example of the content of time-shift addition processing on the time code of an radio wave "MSF" in the UK.
Figure 8B:
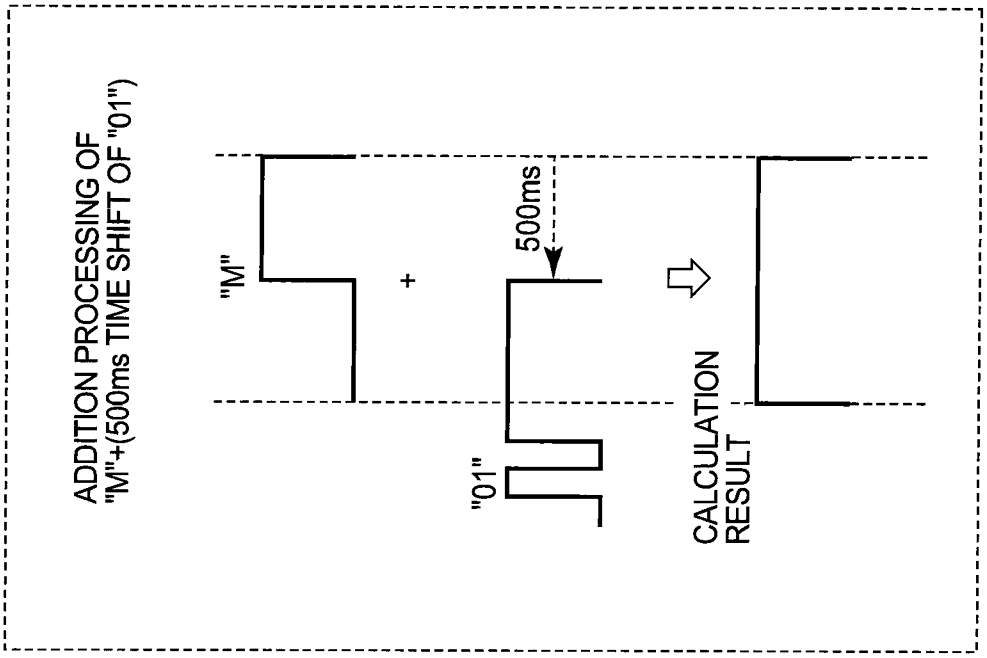
Figure 8C:
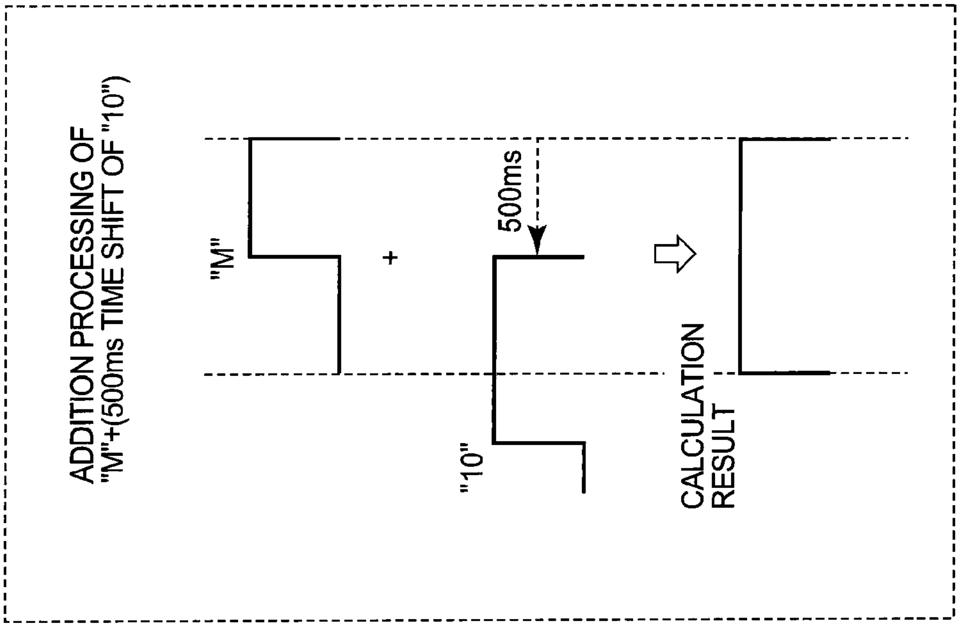
Figure 8D:
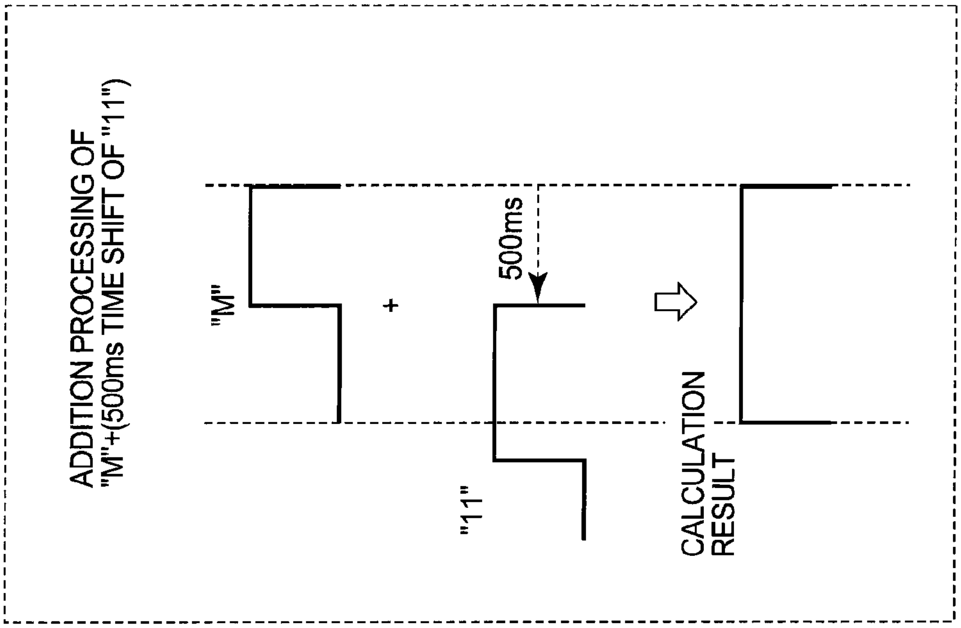

On the other hand, in the time code signal of FIG. 5, the eighth data pulse p8 is a marker pulse having a small pulse width of high level, and thus the calculation result of the time-shift addition processing between the seventh data pulse p7 and the eighth data pulse p8 indicates that "low level" (logical value "0") appears in some section (FIG. 6D). Accordingly, on the basis of the calculation result of this seventh time-shift addition processing, the processing shifts to the "NO" side in the branch processing of the step S8.

FIGS. 7A to 7D are diagrams showing an example of a combination in which a low-level period appears in the time-shift addition processing executed on the time code of "WWVB", and FIGS. 8A to 8D are diagrams showing an example of the time-shift addition processing executed on the time code of "MSF".

When the time code signal obtained in step S1 is based on the standard radio wave "WWVB", with respect to the marker pulse "M" and the position marker pulse "P", the high-level pulse width is equal to a small value of 200 ms, and thus the calculation result of the time-shift addition processing in which this data pulse appears becomes that "low level" (logical value "0") necessarily appears in some period during one second as shown in FIG. 7A to 7D. Furthermore, the marker pulse "M" and the position marker pulse "P" is data pulses which surely appear once for ten seconds. Therefore, by sequentially executing the time-shift addition processing at ten times, a calculation result indicating that "low level" appears at least once in some period for one second is obtained, whereby the processing shifts to the "NO" side in the determination processing of the step S8.

On the other hand, when the time code signal obtained in step S1 is based on the standard radio wave "MSF", even the marker pulse "M" having the smallest pulse width of high level has a pulse width of 500 ms. Therefore, as shown in FIGS. 8A to 8D, the calculation result in the time-shift addition processing in which this data pulse "M" appears becomes "high level" (logical value "1") in the overall section for one second. Accordingly, even when the time-shift addition is executed at ten times or more, only the calculation result indicating "high level" (logical value "1") in the overall section is obtained, and thus the processing is shifted to the "YES" side in the determination processing of the step S9 after the calculation processing is executed at ten times.

Accordingly, when the processing shifts to the "NO" side in the determination processing of the step S8, it is judged that the time code signal is based on "WWVB" (step S11). On the other hand, when the processing shifts to the "YES" side in the determination processing of the step S9, it is judged that the time code signal is based on "MSF" (step S10). The processing of these steps S8 to S11 functions as a judger. Thereafter, this 60 kHz standard radio wave judgment processing is finished. Through the standard radio wave judgment processing as described above, the code type of the 60 kHz standard radio wave is uniquely judged.

In the examples of FIGS. 6A to 8D, a data pulse signal over one second (hereinafter referred to as "one-second signal") which has a start point set to a second (second of time) synchronizing point of the data pulse (the falling point of 0.0 second), and a data pulse signal which is obtained by shifting the next data pulse signal over one second (next one-second signal) by 500 ms are subjected to logical addition. However, a variety of variations may be adopted to pick up the data pulses to be subjected to the calculation. For example, a one-second signal having the start point corresponding to the second synchronizing point of the data pulse, and a signal obtained by shifting the same signal as the one-second signal by 500 ms may be subjected to the logical addition.

Furthermore, a one-second signal having a first start point set to any time point of the time code, and a one-second signal having a second start point corresponding to a time point delayed from the first start point by 500 ms time-shifted so that the first start point and the second start point are overlapped with each other may be subjected to the logical addition. Or, a one-second signal having a first start point set to any time point of the time code, and a one-second signal having a second start point corresponding to a time point delayed from the first start point by 1500 ms time-shifted so that the first start point and the second start point are overlapped with each other may be subjected to the logical addition. According to the above calculation method, the same judgment of the code type as described above can be performed. Furthermore, according to the calculation method as described above, even when the second synchronizing point of the data pulse is not accurately recognized, according to the calculation method as described above, it can be judged with no problem which one of "MSF" and "WWVB" the time code signal is based on.

When the code type is uniquely judged by the 60 kHz standard radio wave judgment processing (FIG. 2) described above, CPU 22 executes the time code deciphering program 27*b* and the time correcting program 27*c* to determine the time information from the time code and correct the time data of the time counting circuit 24 on the basis of the time information of the time code.

As described above, according to the radio wave timepiece 1 of this embodiment, it can be judged by the short-time (about ten seconds) reception of the standard radio wave whether the time code is based on "JJY60" or based on "WWVB" or "MSF" in the above first radio wave judgment processing. Furthermore, according to the first radio wave judgment processing, the code type of the time code is judged by comparing the rising dispersion value and the falling dispersion value. Therefore, even when the electric field intensity of an radio wave is weak and thus the signal waveform of a demodulated time code signal is deteriorated or contaminated with noise, the code type of the time code can be judged relatively accurately.

According to the second radio wave judgment processing of this embodiment, it can be judged by the short-time (about ten seconds) reception of a standard radio wave whether the time code corresponds to "MSF" or "WWVB". Furthermore, according to the second radio wave judgment processing, the code type is judged on the basis of the calculation result of the time-shift addition processing. Therefore, even when the demodulated signal is deteriorated or contaminated with foreign noise, the code type can be relatively accurately identified.

For example, when the electric field intensity of the standard radio wave is reduced and thus the waveform of the demodulated signal is relaxed, the determination time point of the rising edge of the data pulse may be shifted to the front side in CPU 22, so that CPU 22 recognizes the pulse width as being long. Furthermore, when foreign noise is mixed, CPU 22 may recognize as if a short high-level pulse exists in the low-level period of the original data pulse. In such a case, in the construction that the time code of "WWVB" is identified from the pulse waveform or the length of the high-level period within a fixed period is counted and the time code of "WWVB" is identified from the count value, it is impossible to accurately identify the time code of "WWBB" due to variation of the pulse width or mixture of uninvited pulse as described above.

The other hand, according to the second radio wave judgment processing of this embodiment, a low-level value necessarily occurs in the calculation result of the time-shift addition processing between the "P" data pulse and other data pulses, and thus the code types of "WWVB" and "MSF" can be accurately judged unless there is any extreme signal deterioration which causes the 200 ms high-level pulse width of the "P" data pulse of the time code of "WWVB" to be erroneously recognized as 500 ms pulse width. Accordingly, it is expected that the code type judging method based on the time-shift addition processing according to this invention is hardly affected by signal deterioration or noise mixture as compared with a method of judging the code type from a pulse waveform or a method of judging the time code from the total time of high-level periods in a fixed period.

Furthermore, according to the second radio wave judgment processing of this embodiment, the time shift amount of the time-shift addition processing is set to 500 ms, and thus it is proper to the judgment of the code type of "WWVB" and "MSF".

Still furthermore, according to the second radio wave judgment processing of this embodiment, the time-shift addition processing is executed on the data pulse waveform which is obtained in CPU through the rising and falling edge determination process based on the output of the comparator. Therefore, the processing load of the time-shift addition processing can be more greatly reduced as compared with a case where the time-shift applied addition is executed by using waveform data obtained by sampling a demodulated signal at a short period or a case where a demodulated signal is delayed by a delay circuit and the time-shift addition processing is executed by an analog circuit. Furthermore, for example, an effect of a small noise mixed in the demodulated signal can be excluded in the edge determination processing, if necessary.

Still furthermore, according to the second radio wave judgment processing of this embodiment, the calculation of the time-shift applied addition is executed every other data pulse, and this calculation is repeated at a plurality of times. Therefore, the size of the working memory space required for this calculation processing can be reduced. In addition, when a low-level value is halfway found in the calculation result, the calculation processing may be halfway finished, so that the judgment of the data pulse can be quickly finished.

Furthermore, according to the radio wave timepiece 1 of this embodiment, by the radio wave judgment processing as described above, when a user moves to each place in the world with carrying the radio wave timepiece 1, the type of the standard radio wave of each place is automatically identified, and thus the user can obtain time information from the standard radio wave without taking any cumbersome action to change the setting of the radio wave timepiece 1. Furthermore, only short-time reception of a radio wave is required for the identification of the standard radio wave, and thus the time correction can be quickly performed by executing the radio wave reception processing immediately after the judgment processing. In addition, needless radio wave reception processing is omitted, so that the current consumption amount can be reduced.

The present invention is not limited to the above embodiment, and various modifications may be made. For example, the standard radio waves of "MSF" and "WWVB" are selected as the standard radio waves to be judged by the second radio wave judgment processing. However, if the pulse wave of a time code and a pulse wave obtained by time-shifting the former pulse wave by a specific time are subjected to addition processing and this processing result can indicate a first type time code in which a low-level value occurs and a second type time code in which no low-level value occurs, these code types can be selected as judgment processing targets.

In the second radio wave judgment processing of the above embodiment, the calculation of the time-shift applied addition is executed each data pulse, and this calculation is repeated at a plurality of times. However, it may be modified that the pulse waves of a demodulated signal over ten seconds and a pulse wave obtained by wholly time-shifting the pulse waves of the demodulated signal are subjected to addition processing in a lump, and it is judged whether a low-level value section exists in the calculation result or not.

In the second radio wave judgment processing of the above embodiment, the logical addition is executed as the addition processing. However, there may be executed normal addition processing in which high-level is set to “1”, low-level is set to “0” and “2” is gotten by “1+1”.

Still furthermore, in the above embodiment, the radio wave judgment processing is executed at the front stage of the radio wave reception processing at all times. However, this procedure may be modified as follows. That is, first radio wave reception processing is executed by using a manner in which previous reception processing succeeded; however, when normal reception cannot be executed in the first radio wave reception processing, the radio wave reception processing is executed again after the radio wave judgment processing is executed.

Still furthermore, in the above embodiment, the edge determination of the time code signal is executed by the comparator. However, it may be modified so that the time code signal is subjected to AD conversion at a predetermined sampling rate and taken into CPU 22, and then CPU 22 executes the edge determination from the AD-converted data or the time-shift addition processing. The other details of the above embodiment may be properly modified and altered without departing from the subject matter of the present invention.

What is claimed is:

1. A time information receiver which receives a standard radio wave containing a time code in which data pulses are arranged at a predetermined period, and analyzes the time code from a demodulated signal of the standard radio wave, the time information receiver comprising:

a determining section for determining rising and falling points of the demodulated signal;

a time-shift adder for executing, over one second, logical addition of (i) one pulse waveform of the demodulated signal and (ii) a time-shifted pulse waveform obtained by shifting a next pulse waveform of the demodulated signal by a predetermined time, the one pulse waveform and the next pulse waveform being obtained based on a determination of the determining section; and a judger for judging a code type of the time code contained in the received standard radio wave on the basis of whether an addition result of the time-shift adder contains a low-level period or not.

2. The time information receiver according to claim 1, wherein the time code judged by the judger corresponds to a first type time code in which no low-level period occurs when a pulse waveform of the first type time code is added to a pulse waveform of the first type time code shifted by a specific time or a second type time code in which a low-level period occurs when a pulse waveform of the second type time code is added to a pulse waveform of the second type time code shifted by the specific time, and the predetermined time by which the time-shift adder shifts the next pulse waveform of the demodulated signal is the specific time.

3. The time information receiver according to claim 2, wherein the predetermined time by which the time-shift adder shifts the next pulse waveform of the demodulated signal is equal to 500ms, and the judger judges whether the code type belongs to a standard radio wave in the USA or a standard radio wave in the UK on the basis of whether the addition result of the time-shift adder contains a low-level value or not.

4. A radio wave timepiece comprising:

the time information receiver according to claim 3;

a time counter for counting time data;

a display unit for displaying time based on the time data of the time counter;

a decipherer for deciphering the time code according to a format of the code type judged by the judger of the time information receiver to obtain time information; and a time correction section for correcting the time data of the time counter on the basis of the time information obtained by the decipherer.

5. A radio wave timepiece comprising:

the time information receiver according to claim 2;

a time counter for counting time data;

a display unit for displaying time based on the time data of the time counter;

a decipherer for deciphering the time code according to a format of the code type judged by the judger of the time information receiver to obtain time information; and a time correction section for correcting the time data of the time counter on the basis of the time information obtained by the decipherer.

6. The time information receiver according to claim 1, wherein the time-shift adder executes the logical addition on each of the data pulses arranged at the predetermined period in the demodulated signal, thereby executing the logical addition a plurality of times on the demodulated signal, and the judger determines whether a low-level value is not at all contained in the addition result obtained by executing the logical addition the plurality of times, or is contained in at least a part of the addition result obtained by executing the logical addition the plurality of times, thereby judging the code type.

7. A radio wave timepiece comprising:

the time information receiver according to claim 6;

a time counter for counting time data;

a display unit for displaying time based on the time data of the time counter;

a decipherer for deciphering the time code according to a format of the code type judged by the judger of the time information receiver to obtain time information; and a time correction section for correcting the time data of the time counter on the basis of the time information obtained by the decipherer.

8. A radio wave timepiece comprising:

the time information receiver according to claim 1;

a time counter for counting time data;

a display unit for displaying time based on the time data of the time counter;

a decipherer for deciphering the time code according to a format of the code type judged by the judger of the time information receiver to obtain time information; and a time correction section for correcting the time data of the time counter on the basis of the time information obtained by the decipherer.

9. A non-transitory computer readable storage medium having a program stored therein, the program being executable by a computer to which a demodulated signal of a standard radio wave containing a time code in which data pulses are arranged at a predetermined period is inputted, and the program causing the computer to perform functions comprising:

a determining function of determining rising and falling points of the demodulated signal;

a time-shift adding function of executing, over one second, logical addition of (i) one pulse waveform of the demodulated signal, and (ii) a time-shifted pulse waveform obtained by shifting a next pulse waveform of the demodulated signal by a predetermined time, the one pulse waveform and the next pulse waveform being obtained based on a determination of the determining section; and a judging function of judging a code type of the time code contained in the received standard radio wave based on whether an addition result of the time-shift adding function contains a low-level period or not.

* * * * *